United States Patent
Choi et al.

(10) Patent No.: US 12,120,455 B2
(45) Date of Patent: Oct. 15, 2024

(54) SIGNAL PROCESSING DEVICE, AND IMAGE DISPLAY DEVICE COMPRISING SAME

(71) Applicant: LG ELECTRONICS INC., Seoul (KR)

(72) Inventors: Yongjae Choi, Seoul (KR); Dongsoo Park, Seoul (KR); Yonghyun Kim, Seoul (KR); Wonseok Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/909,147

(22) PCT Filed: Mar. 2, 2020

(86) PCT No.: PCT/KR2020/002973
§ 371 (c)(1),
(2) Date: Sep. 2, 2022

(87) PCT Pub. No.: WO2021/177479
PCT Pub. Date: Sep. 10, 2021

(65) Prior Publication Data
US 2023/0095927 A1  Mar. 30, 2023

(51) Int. Cl.
*H04N 7/10* (2006.01)
*H04N 5/21* (2006.01)
(Continued)

(52) U.S. Cl.
CPC .............. *H04N 7/102* (2013.01); *H04N 5/21* (2013.01); *H04N 5/52* (2013.01); *H04N 7/0352* (2013.01);
(Continued)

(58) Field of Classification Search
CPC ............ H04N 7/102; H04N 5/21; H04N 5/52; H04N 7/0352; H04N 21/42607; H04N 21/4305; H04N 21/4382
See application file for complete search history.

(56) References Cited

U.S. PATENT DOCUMENTS 5,991,339 A * 11/1999 Bazes .................... H03H 11/04
375/232
10,644,911 B1 * 5/2020 Chen ...................... H04L 27/04
(Continued)

FOREIGN PATENT DOCUMENTS

KR   1020130043559   4/2013
KR   1020140020129   2/2014
(Continued)

OTHER PUBLICATIONS

PCT International Application No. PCT/KR2020/002973, International Search Report dated Nov. 20, 2020, 3 pages.

*Primary Examiner* — Michael Lee
(74) *Attorney, Agent, or Firm* — LEE, HONG, DEGERMAN, KANG & WAIMEY

(57) ABSTRACT

Disclosed are a signal processing device and an image display apparatus including the same. The signal processing device comprises an equalizer configured to receive an input signal through a channel and equalize the received input signal and a control circuit configured to determine an equalizer control code in response to a first signal output from the equalizer and output the determined equalizer control code to the equalizer, wherein the equalizer may equalize the received input signal based on the equalizer control code. Accordingly, there is an effect of effectively adapting the equalizer even when a channel environment changes.

18 Claims, 13 Drawing Sheets

(51) Int. Cl.
*H04N 5/52* (2006.01)
*H04N 7/035* (2006.01)
*H04N 21/426* (2011.01)
*H04N 21/43* (2011.01)

(52) U.S. Cl.
CPC ............... *H04N 21/42607* (2013.01); *H04N 21/4305* (2013.01)

(56) References Cited

U.S. PATENT DOCUMENTS

| | | | |
|---|---|---|---|
| 2005/0226355 A1* | 10/2005 | Kibune | H04L 25/0328 375/348 |
| 2006/0291551 A1* | 12/2006 | Goth | H04L 25/03038 375/232 |
| 2007/0097825 A1* | 5/2007 | Holstine | G11B 20/10222 369/47.28 |
| 2008/0037393 A1* | 2/2008 | Kawabe | G11B 20/10009 369/47.17 |
| 2011/0299585 A1 | 12/2011 | Tomita et al. | |
| 2012/0207203 A1* | 8/2012 | Hidaka | H04L 25/03057 375/232 |
| 2013/0148704 A1* | 6/2013 | Shinmyo | H04L 27/01 375/232 |
| 2021/0184711 A1* | 6/2021 | Wang | H04B 1/16 |

FOREIGN PATENT DOCUMENTS

| | | |
|---|---|---|
| KR | 101489668 | 2/2015 |
| KR | 101743455 | 6/2017 |

\* cited by examiner

FIG. 12
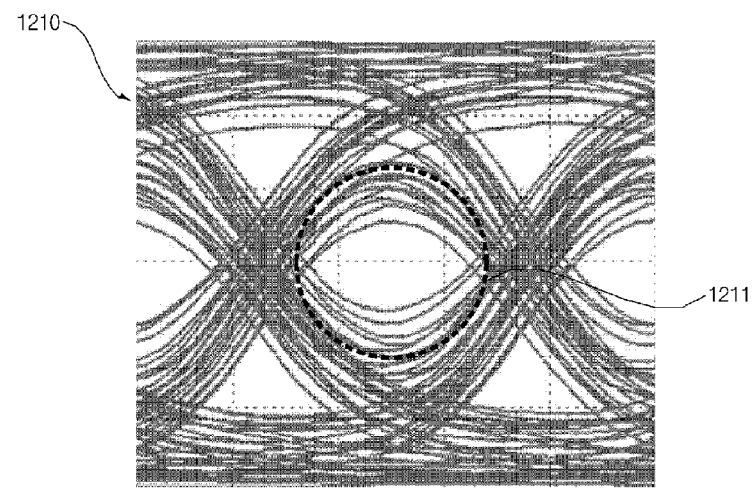
(a)
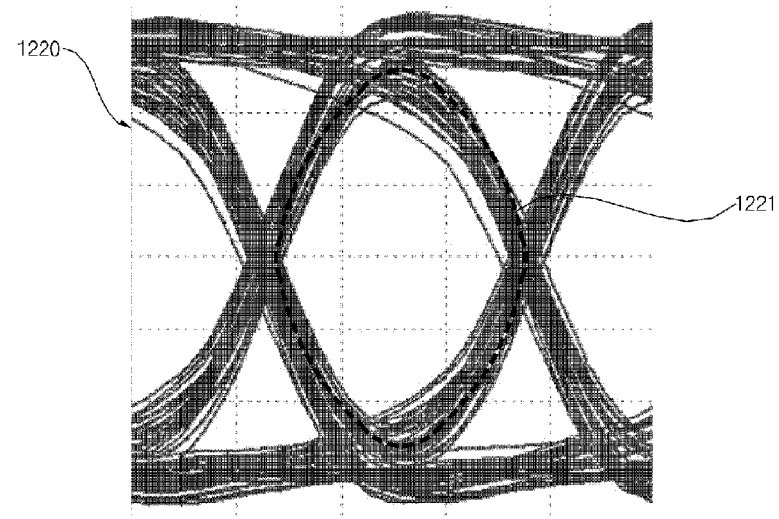
(b)
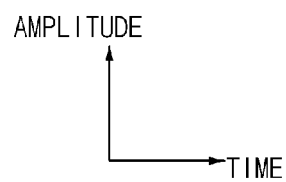

SIGNAL PROCESSING DEVICE, AND IMAGE DISPLAY DEVICE COMPRISING SAME

CROSS-REFERENCE TO RELATED APPLICATIONS

This application is the National Stage filing under 35 U.S.C. 371 of International Application No. PCT/KR2020/002973, filed on Mar. 2, 2020, the contents of which are all incorporated by reference herein in their entirety.

BACKGROUND

1. Field of the Disclosure

The present disclosure relates to a signal processing device and an image display apparatus including the same, and more particularly to a signal processing device and an image display apparatus including the same capable of adaptively equalizing an input signal even when a channel environment changes.

2. Description of the Related Art

In order to smoothly transmit and receive data in a high-speed interface, a receiving device should receive data sent from a transmitting device as it is. A channel exists between the transmitting device and the receiving device, and the data may be distorted due to signal loss caused by the channel.

In general, when the channel is long, signal loss due to the channel is large and data distortion is increased, and when the channel is short, signal loss due to the channel is small and data distortion may be reduced.

In order to restore the loss of such a signal to its original state, the receiving device uses an equalizer EQ. The equalizer is used to reduce the effect of Intersymbol Interference (ISI) caused by channel distortion, and a waveform of the signal output through the equalizer changes according to a compensation size of the equalizer.

When the receiving device recognizes data distorted by the channel, the receiving device may fix an equalizer gain to a specific value. When optimal compensation is achieved by the equalizer, eye opening of an eye pattern of an output signal appears to be large, otherwise, the eye opening appears to be small.

The equalizer may be divided into a continuous time linear equalizer (CTLE) and a decision feedback equalizer (DFE) according to an equalizing method.

In general, equalizer adaptation uses a random data pattern. In the case of using the random data pattern, it takes a long time to adapt the equalizer, and in a clock embedded system, there is a possibility that frequency lock of a clock and data recovery (CDR) circuit may be released. When the frequency lock is released, an operation of the entire system may be affected, and therefore, it is desirable to maintain the frequency lock state once the frequency lock is achieved.

Therefore, there is a need for a method capable of stably maintaining a frequency lock state in a system by effectively performing equalizer adaptation and minimizing intersymbol interference by optimizing a compensation size of an equalizer.

However, the existing equalizer adaptation method has problems in that it takes a long time to adapt the equalizer or an equalizer compensation size is not appropriate, so that it is difficult to stably operate a system or it is difficult to minimize inter-symbol interference.

SUMMARY

An object of the present disclosure is to provide a signal processing device and an image display apparatus including the same capable of effectively adapting an equalizer even when a channel environment changes.

Another object of the present disclosure is to provide a signal processing device and an image display apparatus including the same capable of minimizing intersymbol interference (ISI) due to a channel even when a channel environment changes.

Another object of the present disclosure is to provide a signal processing device and an image display apparatus including the same capable of stably operating a system even when a channel environment changes.

The problems of the present disclosure are not limited to the problems mentioned above, and other problems not mentioned will be clearly understood by those of skilled in the art to which the present disclosure pertains from the description below.

In order to achieve the above objects, there is provided a signal processing device including: an equalizer configured to receive an input signal through a channel and equalize the received input signal; and a control circuit configured to determine an equalizer control code to correspond to a first signal output from the equalizer and output the determined equalizer control code to the equalizer, wherein the equalizer equalizers the received input signal based on the equalizer control code.

Meanwhile, an image display apparatus according to an embodiment of the present disclosure for achieving the above object comprises the signal processing device as described above, and comprises a display.

Effect of the Disclosure

According to the present disclosure, there are the following effects.

A signal processing device according to an embodiment of the present disclosure comprises an equalizer configured to receive an input signal through a channel and equalize the received input signal and a control circuit configured to determine an equalizer control code in response to a first signal output from the equalizer and output the determined equalizer control code to the equalizer, wherein the equalizer may equalize the received input signal based on the equalizer control code. Accordingly, there is an effect of effectively adapting the equalizer even when a channel environment changes.

Meanwhile, in the signal processing device according to an embodiment of the present disclosure, the control circuit may detect whether a clock pattern signal is included in the first signal output from the equalizer, and in response to the clock pattern signal being included in the first signal, the control circuit may measure a magnitude of the clock pattern signal and output an equalizer control code corresponding to the measured magnitude of the clock pattern signal to the equalizer. Accordingly, there is an effect of effectively adapting the equalizer even when a channel environment changes.

Meanwhile, in the signal processing device according to an embodiment of the present disclosure, the equalizer may equalize the received input signal by applying an equalizer gain to the received input signal. Therefore, there is an effect of minimizing intersymbol interference (ISI) due to a channel even when a channel environment changes.

Meanwhile, in the signal processing device according to an embodiment of the present disclosure, the equalizer control code value may increase as the measured magnitude of the clock pattern signal increases, and a gain value of the equalizer gain may decrease as the code value of the equalizer control code increases. Therefore, there is an effect of minimizing the intersymbol interference (ISI) due to a channel even when a channel environment changes.

Meanwhile, in the signal processing device according to an embodiment of the present disclosure, the clock pattern signal may include a first pattern signal and a second pattern signal, and the control circuit may apply an offset voltage to the first pattern signal and measure the magnitude of the clock pattern signal based on a difference value between the second pattern signal and the first pattern signal to which the offset voltage is applied. Accordingly, there is an effect of effectively adapting the equalizer even when a channel environment changes.

Meanwhile, in the signal processing device according to an embodiment of the present disclosure, the control circuit comprises an offset applying circuit configured to apply the offset voltage, an amplifier configured to amplify the difference value between the second pattern signal and the first pattern signal to which the offset voltage is applied, and a detector outputting a detection signal or a non-detection signal based on an output value from the amplifier, wherein the detector outputs the detection signal when a polarity of the output value from the amplifier is changed, and outputs the non-detection signal in response to the polarity of the output value from the amplifier being not changed. Accordingly, there is an effect of effectively adapting the equalizer even when a channel environment changes.

Meanwhile, in the signal processing device according to an embodiment of the present disclosure, the offset applying circuit may repeatedly increase a magnitude of the applied offset voltage as much as a predetermined magnitude by a specified number of times, and the detector may output the detection signal or the non-detection signal each time the magnitude of the applied offset voltage is increased. Accordingly, there is an effect of effectively adapting the equalizer even when a channel environment changes.

Meanwhile, the signal processing device according to an embodiment of the present disclosure may further include a digital controller configured to increase a first counter value each time the detection signal is output, wherein when a non-detection signal is output, the digital controller may output the first counter value to the control circuit. Accordingly, there is an effect of effectively adapting the equalizer even when a channel environment changes.

Meanwhile, the signal processing device according to an embodiment of the present disclosure may further include: a register configured to store a preset equalizer control code for each counter value; and a processor configured to compare the first counter value received from the digital controller with the counter value stored in the register, determine an equalizer control code corresponding to the first counter value, and output the determined equalizer control code to the equalizer. Accordingly, there is an effect of effectively adapting the equalizer even when a channel environment changes.

Meanwhile, the signal processing device according to an embodiment of the present disclosure may further include a transmitter configured to transmit a feedback signal through a clock and data recovery circuit (CDR) configured to recover a clock signal or a data signal from the first signal output from the equalizer and a channel, wherein, in response to the clock signal or the data signal being not recovered from the first signal, the clock and data recovery circuit CDR may output a feedback signal to the transmitter. Accordingly, there is an effect of enabling a stable operation of a system even when a channel environment changes.

Effects of the present disclosure are not limited to the effects mentioned above, and other effects not mentioned will be clearly understood by those of skilled in the art to which the present disclosure pertains from the description of the claims.

BRIEF DESCRIPTION OF THE DRAWINGS

FIGS. 8 to 13 are diagrams referred to the description of FIG. 7.

DETAILED DESCRIPTION OF THE PREFERRED EMBODIMENTS

Figure 1:
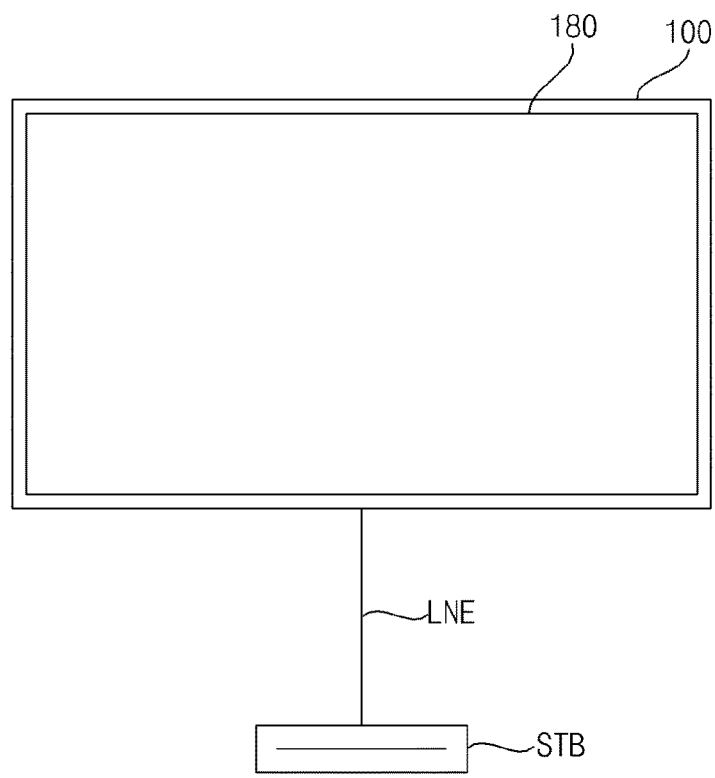
FIG. 1 is a diagram showing an image display apparatus according to an embodiment of the present disclosure.

Hereinafter, the present disclosure will be described in detail with reference to the accompanying drawings.

Regardless of the reference numerals, the same or similar components are assigned the same reference numbers, and redundant descriptions thereof will be omitted. In the following description, usage of suffixes such as 'module', 'part' or 'unit' used for referring to elements is given merely to facilitate explanation of the present disclosure, without having any significant meaning by itself.

Accordingly, the terms "module" and "unit" may be used interchangeably.

In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings. Also, the present disclosure is not limited to a specific disclosed form, but comprises all modifications, equivalents, and substitutions without departing from the scope and spirit of the present disclosure.

It will be understood that, although the terms first, second, etc. may be used herein to describe various elements, these elements should not be limited by these terms. These terms are only used to distinguish one element from another.

When it is mentioned that a certain element is "connected to" or "electrically connected to" a second element, the first element may be directly connected or electrically connected to the second element, but it should be understood that a third element may intervene therebetween. Meanwhile, when it is mentioned that a certain element is "directly connected to" or "directly electrically connected to" a second element, it should be understood that there is no third element therebetween.

As used herein, the singular forms "a", "an" and "the" are intended to include the plural forms as well, unless the context clearly indicates otherwise.

It will be further understood that the terms "comprises" "comprising," "comprises" and/or "including" when used herein, specify the presence of stated features, integers, steps, operations, elements, and/or components, but do not preclude the presence or addition of one or more other features, steps, operations, elements, components, and/or groups thereof.

FIG. 1 is a diagram showing an image display apparatus according to an embodiment of the present disclosure.

Referring to the drawing, an image display apparatus 100 according to an embodiment of the present disclosure may include a display 180.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

Meanwhile, the image display apparatus 100 may receive an external input signal through an external electronic device or a set-top box (STB) and a cable (LNE).

The image display apparatus 100 according to an embodiment of the present disclosure comprises an equalizer 610 receiving an input signal through a channel and equalize the received input signal and a control circuit 630 determining an equalizer control code in response to a first signal output from the equalizer and output the determined equalizer control code to the equalizer, wherein the equalizer 610 may equalize the received input signal based on the equalizer control code. Accordingly, the equalizer may be effectively adapted even when a channel environment changes.

Meanwhile, the equalizer 610 in the image display apparatus 100 according to an embodiment of the present disclosure may equalize the received input signal by applying an equalizer gain to the received input signal. Accordingly, the equalizer may be effectively adapted even when a channel environment changes.

Meanwhile, the image display apparatus 100 in FIG. 1 may be a monitor, a TV, a tablet PC, a mobile terminal, etc.

Figure 2:
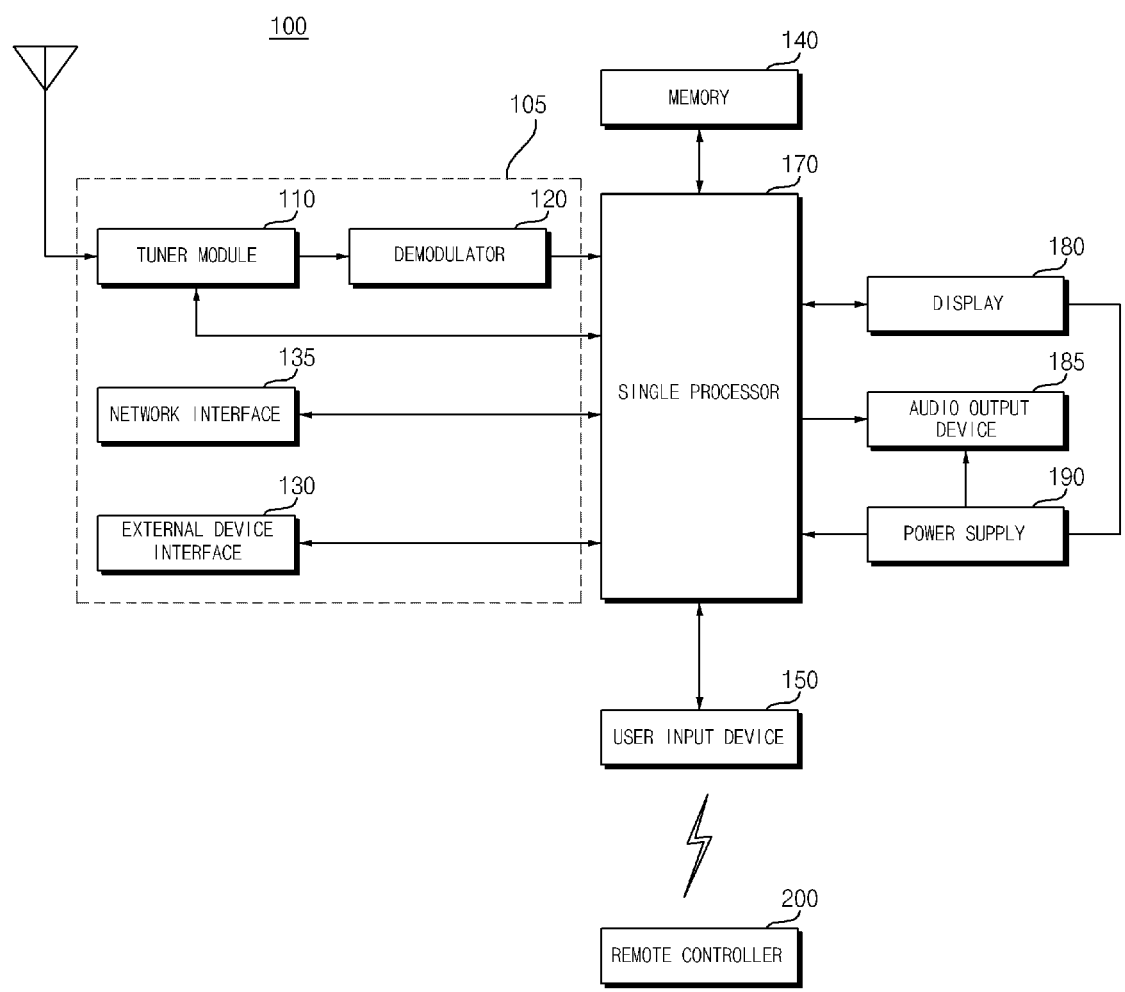
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure comprises an image receiver 105, an external apparatus interface 130, a memory 140, a user input interface 150, a sensor device (not shown), a signal processor 170, a display 180, and an audio output device 185.

The image receiver 105 may include a tuner 110, a demodulator 120, a network interface 135, and an external apparatus interface 130.

Meanwhile, unlike the drawing, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 may process a digital broadcast signal or an analog broadcast signal. The analog baseband image or audio signal (CVBS/SIF) output from the tuner 110 may be directly input to the signal processor 170.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

For example, the external device interface 130 may receive an external input signal through the component terminal CMP or the like. In this case, the external input signal may include a mixed sync signal and an image signal.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including Meanwhile, the network interface 135 may include a wireless transceiver (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output device 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like.

That is, the signal processor 170 may perform a variety of signal processing and thus it may be implemented in the form of a system on chip (SOC). This will be described later with reference to FIG. 3.

In addition, the signal processor 170 may control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 based on a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof.

The power supply 190 applies corresponding power to the image display apparatus 100. Particularly, the power may be supplied to a controller 170 which may be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
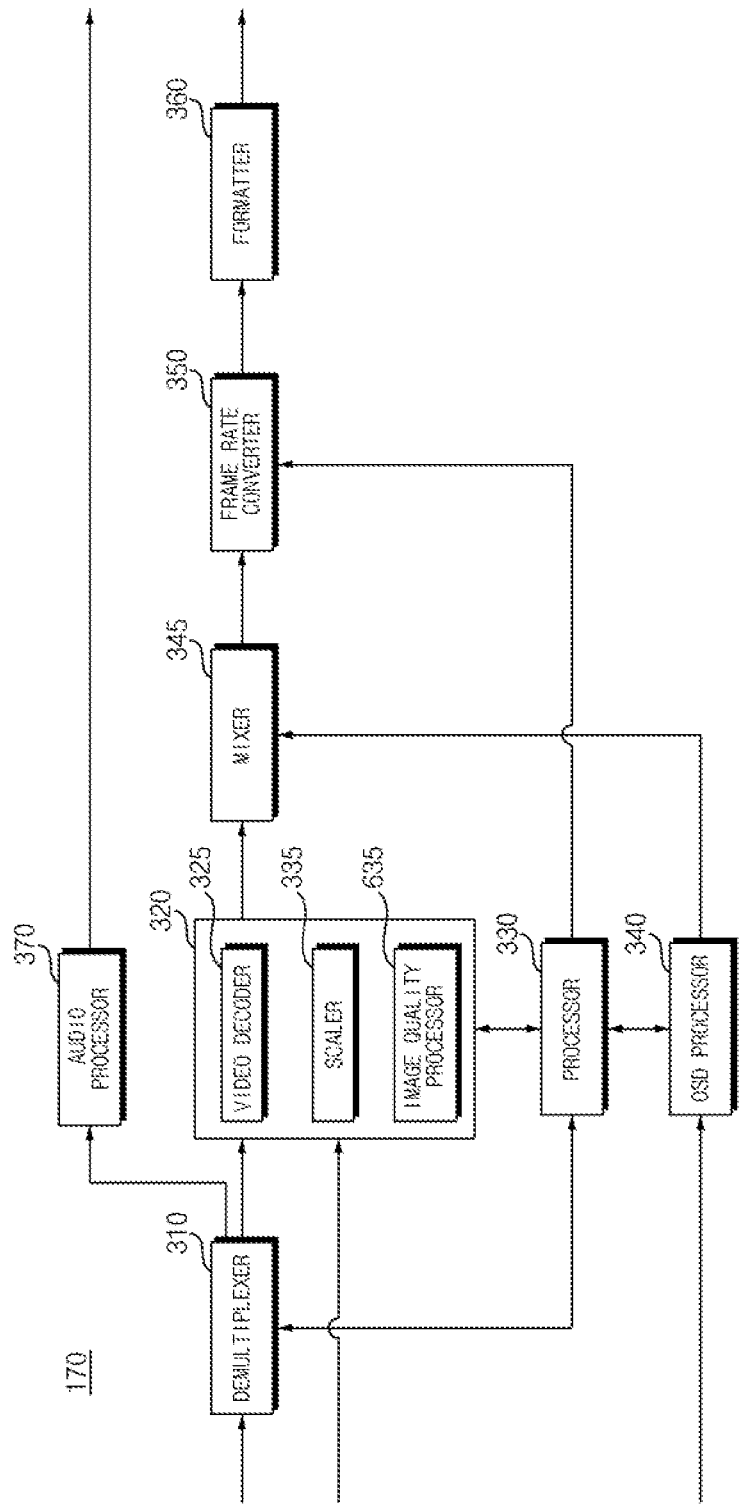
FIG. 3 is an example of an internal block diagram of a signal processor in FIG. 2.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal based on a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The mixer 345 may mix an OSD signal generated by the OSD processor 340 with a decoded image signal image-processed by the image processor 320. The mixed image signal is supplied to the frame rate converter 350.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 based on a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it may be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4:
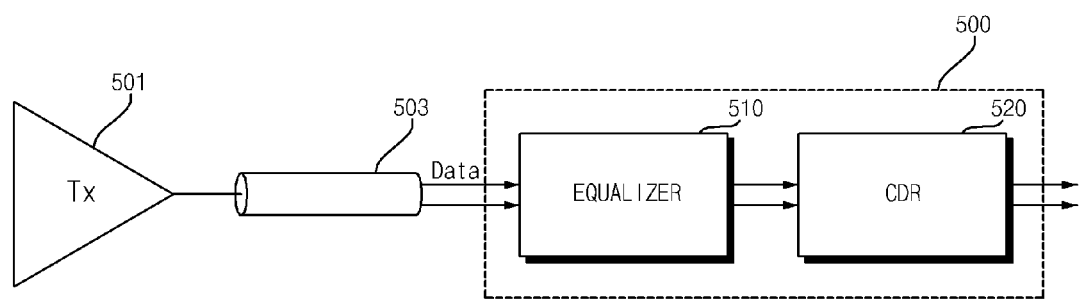
FIG. 4 is an example of an internal block diagram of a general signal processing device.

FIG. 4 is an example of an internal block diagram of a general signal processing device.

The general signal processing device 500 is a device receiving a signal transmitted from a transmitting device 501. The signal transmitted from the transmitting device 501 is transmitted to the signal processing device 500 through a channel 503.

The signal processing device 500 uses an equalizer 510 and a clock and data recovery circuit (CDR) 520 to compensate for data distortion due to loss of a signal occurring while passing through the channel 503. The equalizer 510 applies a set gain to the input signal and outputs the same, and a signal output from the equalizer 510 is received by the clock and data recovery circuit 520.

When the signal processing device 500 receives a signal, clock training may be performed to determine a frequency of the corresponding signal. During a clock training period, clock pattern data, not a signal including actual data, may be transmitted. For example, when predetermined clock pattern data or random pattern data is received, the signal processing device 500 determines a frequency of the signal based on the received clock pattern data or random pattern data.

When the frequency is determined, the clock and data recovery circuit 520 performs frequency lock. After the frequency lock is achieved, the signal processing device 500 performs alignment training to adjust alignment of received data, and then enters a normal operation period to receive a general video signal.

After the frequency lock is achieved, the clock and data recovery circuit 520 recovers the clock and data using the equalized signal. If the clock and data recovery circuit 520 cannot properly recover the clock and data, the frequency lock may be released.

When the frequency lock is released, the transmitting device 501 and the signal processing device 500 need to perform initial training again in order to normally receive a video signal. That is, clock training and alignment training should be performed again.

Figure 5:
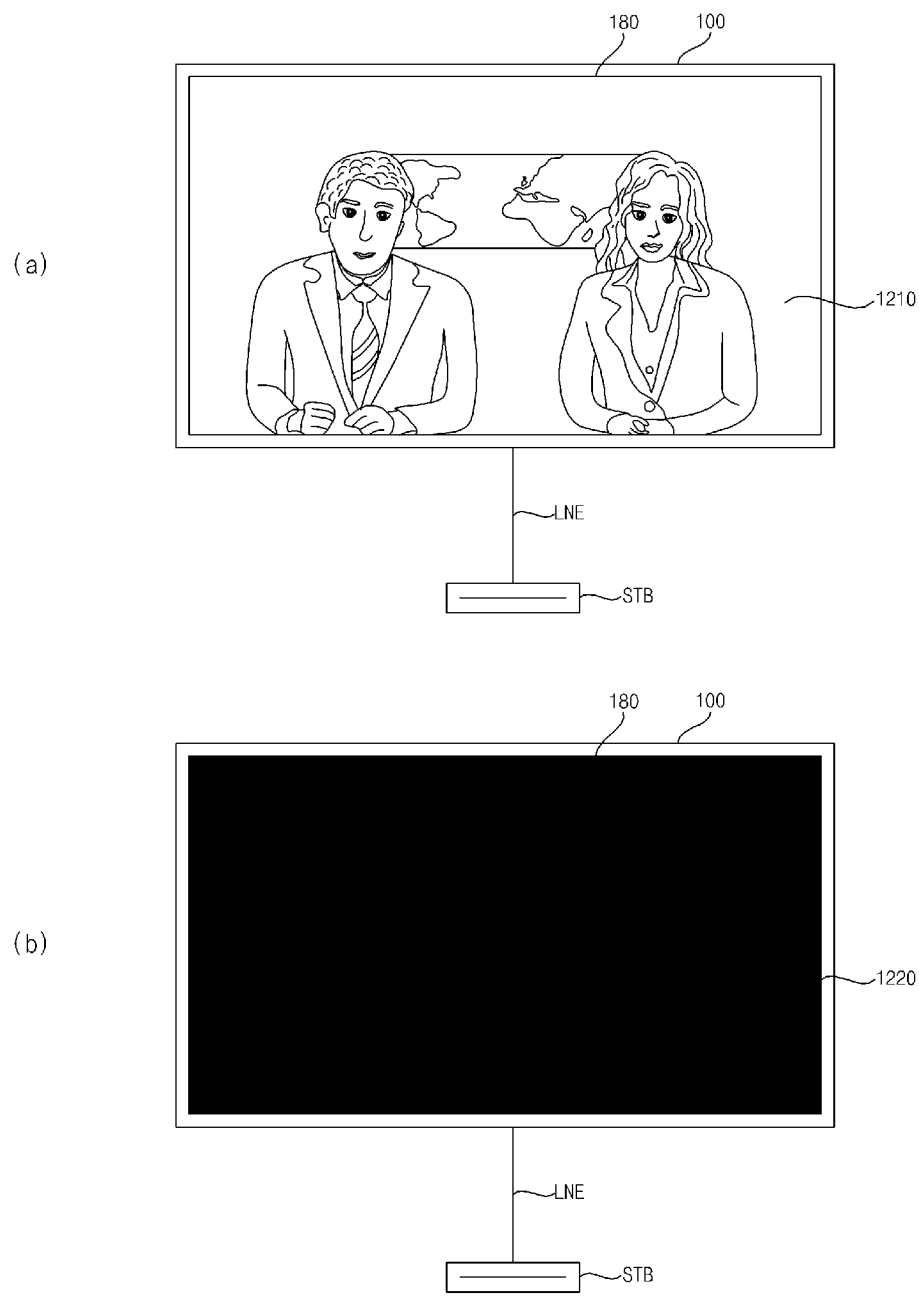
FIG. 5 is a diagram illustrating an image display on an image display apparatus.

FIG. 5 is a diagram illustrating an image display on an image display apparatus based on data received from a general signal processing device.

Referring to the drawing, an image display apparatus 100 may display an image 1210 corresponding to an image signal on the display 180 using information equalized by the equalizer and restored by the clock and data recovery circuit.

If equalization is not properly performed in the signal processing device 500, the frequency lock may be released. In this case, the image display apparatus 100 cannot display a normal image 1210 on the display 180 while the signal processing device 500 performs clock training and alignment training again. Accordingly, a black screen 1220 may be momentarily displayed on the display 180, and a user who is looking at the display 180 may feel instantaneous blinking of a screen.

Therefore, in the image display apparatus, it is desirable to prevent the blinking of the screen.

To this end, it is preferable that the signal processing device accurately recognizes a state of the received signal and appropriately equalize and restore the clock and data.

This will be described with reference to FIG. 6 and the following drawings.

Figure 6:
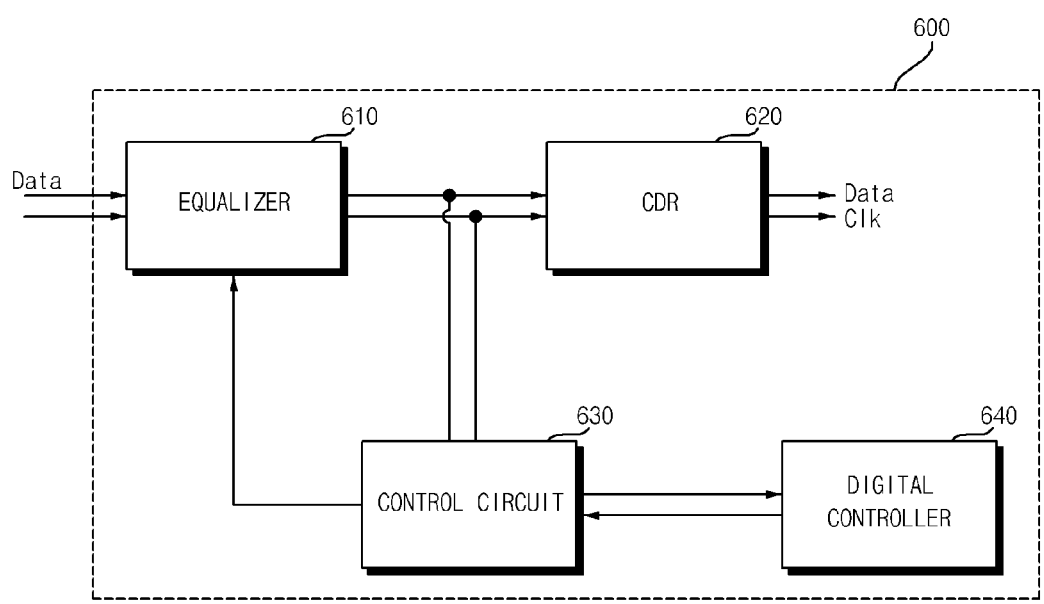
FIGS. 6 and 7 are examples of internal block diagrams of a signal processing device according to an embodiment of the present disclosure.
Figure 7:
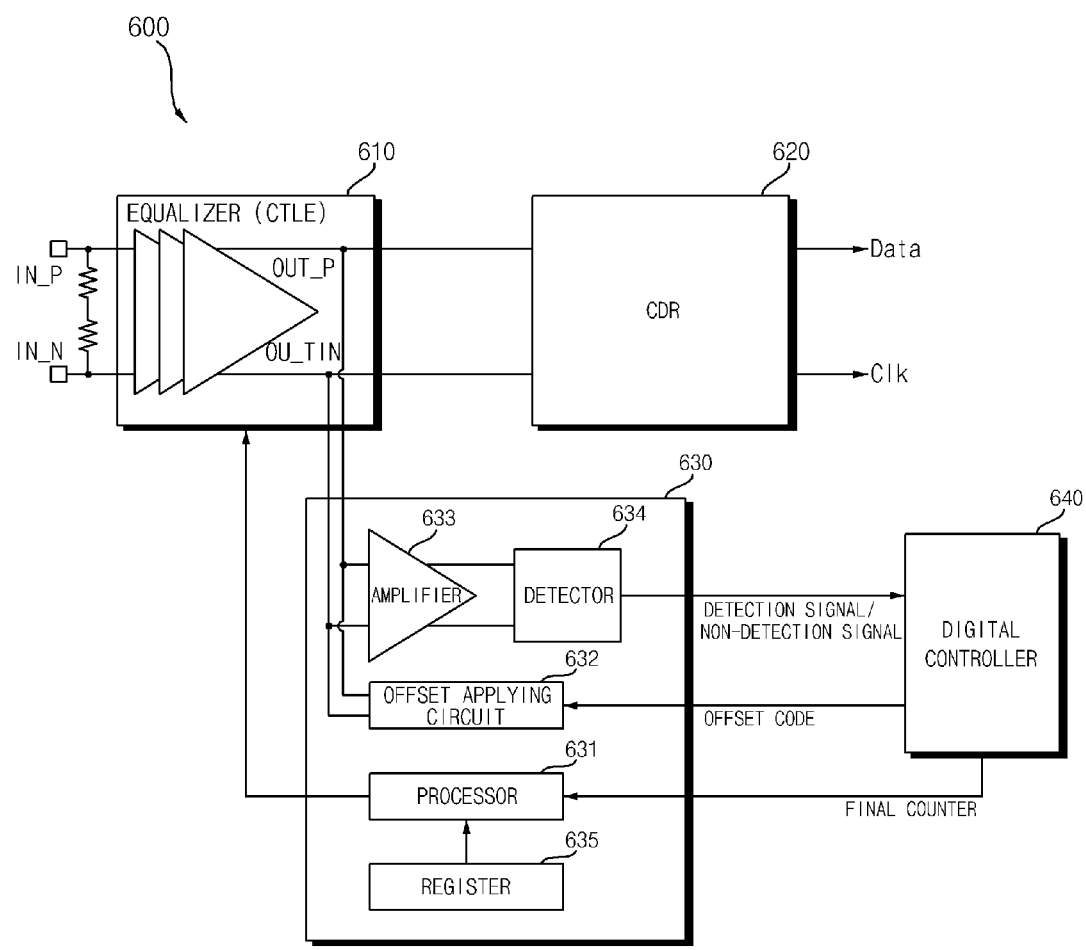

FIG. 6 is an example of an internal block diagram of a signal processing device according to an embodiment of the present disclosure, and FIG. 7 is an example showing a detailed configuration of an equalizer and a control circuit of the signal processing device of FIG. 6. FIGS. 8 to 13 are diagrams referred to in the description of FIG. 7.

First, referring to FIG. 6, the signal processing device 600 according to an embodiment of the present disclosure comprises an equalizer 610 receiving an input signal through a channel and equalize the received input signal and a control circuit 630 determining an equalizer control code in response to a first signal output from the equalizer 610 and output the determined equalizer control code to the equalizer 610, wherein the equalizer 610 equalizes the received input signal based on the equalizer control code.

Meanwhile, the control circuit 630 detects whether a clock pattern signal is included in the first signal output from the equalizer 610, and in response to the clock pattern signal being included in the first signal, the control circuit 630 may measure a magnitude of the clock pattern signal and output an equalizer control code corresponding to the measured magnitude of the clock pattern signal to the equalizer 610.

The clock pattern signal is a signal transmitted from the transmitting device to a receiving device for clock training. The signal processing device 600 of the present disclosure may serve as a receiving device. The signal processing device 600 may detect whether a clock pattern signal is included in the first signal output from the equalizer 610, and when the clock pattern signal is included, the signal processing device 600 determines that it is a clock training period, and performs adaptation of the equalizer 610.

The control circuit 630 may measure the magnitude of the received clock pattern signal during the clock training period and output the equalizer control code corresponding to the measured magnitude of the signal. The equalizer control code is a code used to compensate for the magnitude of the signal input to the equalizer 610. The equalizer control code is set so that as the measured magnitude of the clock pattern signal increases, the code value increases.

When receiving the equalizer control code from the control circuit 630, the equalizer 610 may apply an equalizer gain to the input signal according to the control code. That is, the equalizer 610 may equalize the received input signal. The equalizer gain is set so that the gain value decreases as the code value of the equalizer control code increases.

As the magnitude of the received clock pattern signal decreases, the gain value applied to the input signal increases, and as the magnitude of the received clock pattern signal increases, the gain value applied to the input signal decreases. Accordingly, the gain of the equalizer 610 may be set to suit the magnitude of the input signal.

Meanwhile, the signal processing device 600 according to an embodiment of the present disclosure may further include a digital controller 640 increasing a first counter value each time a detection signal is output from the control circuit 630 and a clock and data recovery circuit 620 recovering a clock signal or a data signal from the first signal output from the equalizer 610. Accordingly, a stable operation of the system may be achieved even when a channel environment changes.

Referring to FIG. 7, in the signal processing device 600 according to an embodiment of the present disclosure, the control circuit 630 may include a processor 631, an offset applying circuit 632, an amplifier 633, a detector 634, and a register 635.

In FIG. 7, the equalizer 610 may be a continuous time linear equalizer (CTLE). The equalizer 610 may receive input signals IN_P and IN_N from both input terminals, equalize the received input signals, and output signals OUT_P and OUT_N.

Meanwhile, when the signal input to the equalizer 610 is a clock pattern signal, a gain of the equalizer 610 may be set to 0 dB. To this end, the processor 631 may detect whether a clock pattern signal is included in the first signal, and when the clock pattern signal is included, the processor 631 may output an equalizer control code corresponding to an equalizer gain value of 0 dB to the equalizer 610. When the gain value is set to 0 dB, the magnitude of the signal output from the equalizer 610 is equal to the magnitude of the clock pattern signal input to the equalizer 610. Accordingly, the control circuit 630 may measure the magnitude of the clock pattern signal.

The clock pattern signal may include a first pattern signal and a second pattern signal. The first pattern signal and the second pattern signal may be signals received at both input terminals of the equalizer 610. In a state where the equalizer gain is 0 dB, the signals OUT_P and OUT_N output from the equalizer 610 may be the same as the first pattern signal and the second pattern signal.

The offset applying circuit 632 may apply an offset voltage to the first signal output from the equalizer 610. An output terminal of the offset applying circuit 632 may be connected to both output terminals of the equalizer 610. The offset applying circuit 632 may apply an offset voltage to the first pattern signal or the second pattern signal.

The offset applying circuit 632 may receive an offset code from the digital controller 640 and output an offset voltage corresponding to the offset code value. Since the number of offset codes is set in advance, the offset applying circuit 632 may repeatedly increase the offset voltage by a predetermined amount and output the same number of times as the number of offset codes.

When the offset code value received from the digital controller 640 increases, the offset applying circuit 632 may increase the magnitude of the offset voltage according to the offset code value and apply the offset voltage having the increased magnitude to the first signal.

The amplifier 633 may be configured using an amplifier such as a general operational amplifier (op-amp). Both input terminals of the amplifier 633 may be respectively connected to both output terminals of the offset applying circuit 632. Accordingly, an output value of the amplifier 633 may be a value obtained by amplifying a difference value between the signal in which the offset voltage is applied to the first pattern signal and the second pattern signal.

The detector 634 may output a detection signal or a non-detection signal based on an output value from the amplifier 633. For example, the detection signal may be '1' and the non-detection signal may be '0'. The detector 634 may output a detection signal when the polarity of the output value of the amplifier 633 changes, and output a non-detection signal when the polarity of the output value of the amplifier 633 does not change.

The digital controller 640 may receive the detection signal or the non-detection signal from the detector 634, sequentially increase the offset code from a minimum value to a maximum value, and output the same to the offset applying circuit 632. For example, the offset code may have a total of 16 code values ranging from a minimum value of '0000' to a maximum value of '1111'.

The digital controller 640 may output the offset code to the offset applying circuit 632 16 times, while sequentially increasing the offset code by '1' from '0000' to '1111' during the clock training period. Accordingly, the offset applying circuit 632 may output the offset voltage 16 times.

The number of offset codes may be greater or fewer than 16, if necessary. The number of offset codes may be input through the signal processing device 600 or an input device (not shown) of an external device connected to the signal processing device 600, and may be stored in advance in a memory (not shown) of the signal processing device 600.

As the number of offset codes increases, a voltage increase for increasing the offset voltage may decrease. Accordingly, the signal processing device 600 may more accurately measure the magnitude of the clock pattern signal. Meanwhile, as the number of offset codes decreases, the voltage increase for increasing the offset voltage may increase. Accordingly, a speed at which the signal processing device 600 measures the magnitude of the clock pattern signal may increase.

The digital controller 640 may increase the first counter value each time the detector 634 outputs a detection signal. The digital controller 64 may initialize the first counter value to '0' before outputting the minimum value of the offset code. Also, when the detector 634 outputs a non-detection signal, the digital controller 640 may no longer increase the first counter value.

The digital controller 640 may increase the first counter value according to the signal output from the detector 634, while sequentially outputting the offset codes from the minimum value to the maximum value. After outputting the maximum value of the offset code and receiving the detection signal or non-detection signal from the detector 634, the digital controller 640 may set the first counter value as a final counter value and output the final counter value to the processor 631.

The register 635 may store a preset equalizer control code for each counter value. For example, the counter value may have 16 values from '0000' to '1111', and the equalizer control code may include 16 codes to correspond to each counter value. The number of counter values may be set to correspond to the number of offset codes. The number of counter values may be greater or fewer than 16, if necessary.

When the final counter is received from the digital controller 640, the processor 631 may compare the final counter value with the counter values stored in the register 635 and select an equalizer control code corresponding to a counter having the same value as the last counter. The processor 631 may output the selected equalizer control code to the equalizer 610.

Meanwhile, in the signal processing device 600 according to an embodiment of the present disclosure, the control circuit 630 may further include a clock buffer (not shown). The clock buffer may receive and temporarily store the first signal output from the equalizer 610. The processor 631 may detect whether a clock pattern signal is included in the first signal stored in the clock buffer.

Alternatively, the first signal output from the equalizer 610 may be continuously temporarily stored in the clock buffer, and all of the first signals input to the control circuit 630 may be signals temporarily stored in the clock buffer.

The offset applying circuit 632 may apply an offset voltage to the first signal stored in the clock buffer. Thereafter, the output from the amplifier 633 may be detected by the detector 634 to detect whether a clock pattern signal is included in the first signal.

Meanwhile, the signal processing device 600 according to an embodiment of the present disclosure may further include a clock and data recovery circuit 620 recovering a clock signal or a data signal from the first signal output from the equalizer 610 and output the recovered signal. Also, the signal processing device 600 may further include a transmitter (not shown) transmitting a feedback signal through a channel.

When the clock and data recovery circuit 620 cannot recover the clock signal or the data signal from the first signal output from the equalizer 610, the clock and data recovery circuit 620 may output a feedback signal to the transmitter. The transmitter of the signal processing device 600 may transmit the feedback signal to a transmitting device, and the transmitting device may receive the feedback signal. Thereafter, the transmitting device may transmit the clock pattern signal back to the signal processing device 600 in order to perform the clock training process again. Accordingly, even when a channel environment changes, a stable operation of the system may be performed.

Meanwhile, in the signal processing device 600 according to another embodiment of the present disclosure, the digital controller 640 may operate differently from the digital controller according to the embodiment described above.

The digital controller 640 may output offset codes to the offset applying circuit 632 up to 16 times, while sequentially increasing the offset codes by '1' from '0000' to '1111' during the clock training period.

The digital controller 640 may increase the first counter value according to the detection signal output from the detector 634, while sequentially outputting the offset codes. If a non-detection signal is output from the detector 634, the digital controller 640 may no longer output the offset codes.

The digital controller 640 may set a first counter value counted to a point in time when the non-detection signal is output from the detector 634, as a final counter value, and output the final counter value to the processor 631. Accordingly, the digital controller 640 may directly output the final counter value according to the non-detection signal output, even in a state in which the offset codes are not output to the maximum value.

When the final counter value is received from the digital controller 640, the processor 631 may compare the final counter value with the counter values stored in the register 635, and select an equalizer control code corresponding to a counter having the same value as the last counter. The processor 631 may output the selected equalizer control code to the equalizer 610.

Figure 8:
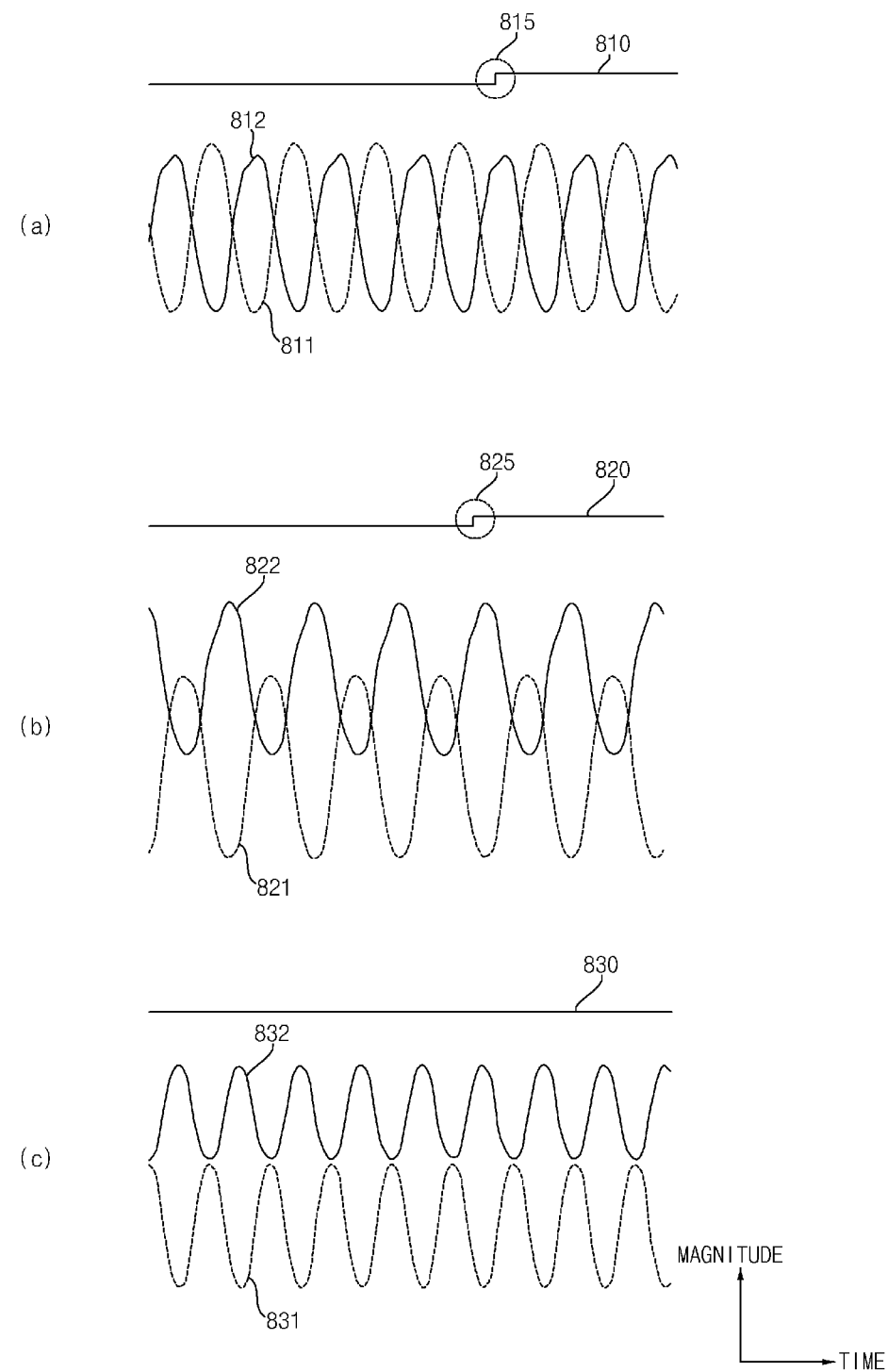

FIG. 8 is a diagram illustrating that a detection signal or a non-detection signal is output from the detector 634 as the magnitude of the offset signal output from the offset applying circuit 632 illustrated in FIG. 7 increases. Referring to FIG. 8, (a) is a case in which the offset voltage is 0, (b) is a case in which the magnitude of the offset voltage is A, and (c) is a case in which the magnitude of the offset voltage is B (B>A). In this example, the detection signal has a value of '1' and the non-detection signal has a value of '0'.

As shown in (a) of FIG. 8, when the offset voltage is 0, a first pattern signal 811 and a second pattern signal 812 appear in a form similar to a sine wave. The phases of the first pattern signal 811 and the second pattern signal 812 are opposite to each other. Accordingly, a polarity of a difference value between the first pattern signal 811 and the second pattern signal 812 may be continuously changed to positive and negative numbers, and the detector 634 may output a detection signal 815.

As in (b) of FIG. 8, when the magnitude of the offset voltage is A, a second pattern signal 822 appears in a form similar to a sine wave, like the second pattern signal 812 of (a) of FIG. 8. A signal 821 in which an offset voltage is applied to the first pattern signal is a signal having a voltage value lowered by A than the first pattern signal 811 of FIG. 8A. A polarity of a difference value between the second pattern signal 822 and the signal 821 in which the offset voltage is applied to the first pattern signal may be continuously changed to positive and negative values. Accordingly, the detector 634 may output a detection signal 825.

As shown in (c) of FIG. 8, when the magnitude of the offset voltage is B, a second pattern signal 832 appears in a form similar to a sine wave, like the second pattern signal 812 of (a) of FIG. 8. A signal 831 in which an offset voltage is applied to the first pattern signal is a signal having a voltage value lowered by B than the first pattern signal 811 of FIG. 8A. A polarity of a difference value between the second pattern signal 832 and the signal 831 in which the offset voltage is applied to the first pattern signal does not change. Accordingly, the detector 634 may not output a detection signal and may output a non-detection signal 830.

Figure 9:
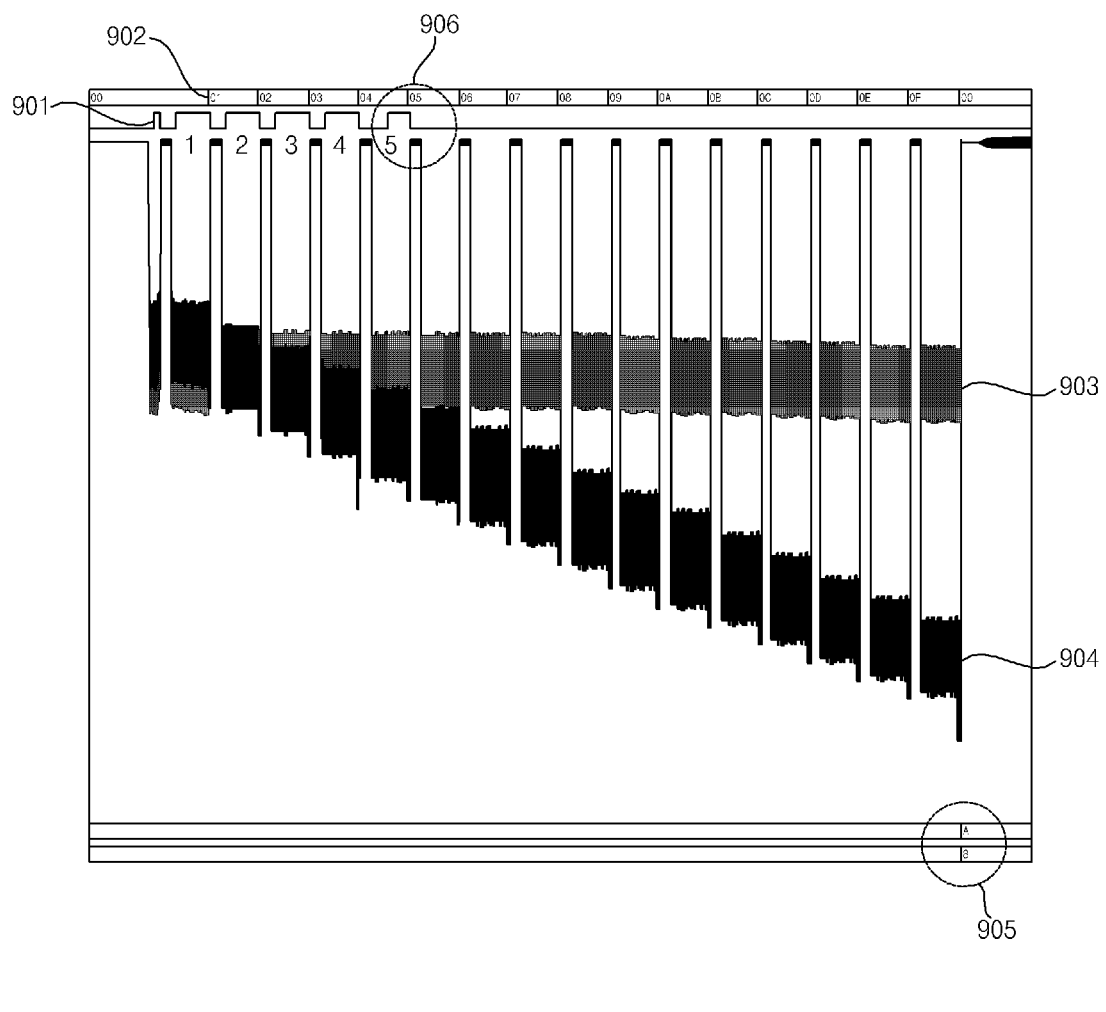

FIG. 9 is a diagram illustrating a clock training period according to an embodiment of the present disclosure. FIG. 9 illustrates output of an equalizer output value, a detection signal and a non-detection signal, an offset code, and a final counter value.

In the clock training period, when the equalizer adaptation is started, the digital controller 640 sets the first counter to '0' and outputs the offset code 902, while sequentially increasing the offset code 902 from a minimum value to a maximum value. Accordingly, an offset voltage applied to the first pattern signal sequentially increases, and the voltage value of the signal 904 in which the offset voltage is applied to the first pattern signal sequentially decreases.

Each time the offset code 902 is output, the detector 634 outputs a detection signal 901. Each time the detection signal 901 is output, the digital controller 640 increases the first counter value. FIG. 9 illustrates that the detection signal 901 is output a total of five times and the first counter value increases to 5 equal to the number of times the detection signal 901 is output.

When the offset voltage is sequentially increased and the polarity of the difference value between the signal 904 in which the offset voltage is applied to the first pattern signal and the second pattern signal 903 does not change, the detection signal 901 is not output and a non-sensing signal 906 is output.

As the offset code 902 increases to be output, the difference value between the signal 904 in which the offset voltage is applied to the first pattern signal and the second pattern signal 903 increases, so that the detector 634 does not output the detection signal 901 any longer and the first counter value does not increase from '5'. After outputting the maximum value of the offset code 902, the digital controller 640 determines the first counter value of '5' as a final counter value and outputs the same to the processor 631.

The processor 631 compares the final counter value of '5' with the counter values stored in the register 635 and outputs an equalizer control code 905 corresponding to '5' to the equalizer 610. Thereby, the equalizer adaptation operation is terminated. Accordingly, the equalizer 910 may equalize the input signal by applying an equalizer gain suitable for the magnitude of the clock pattern signal to the input signal.

Figure 10:
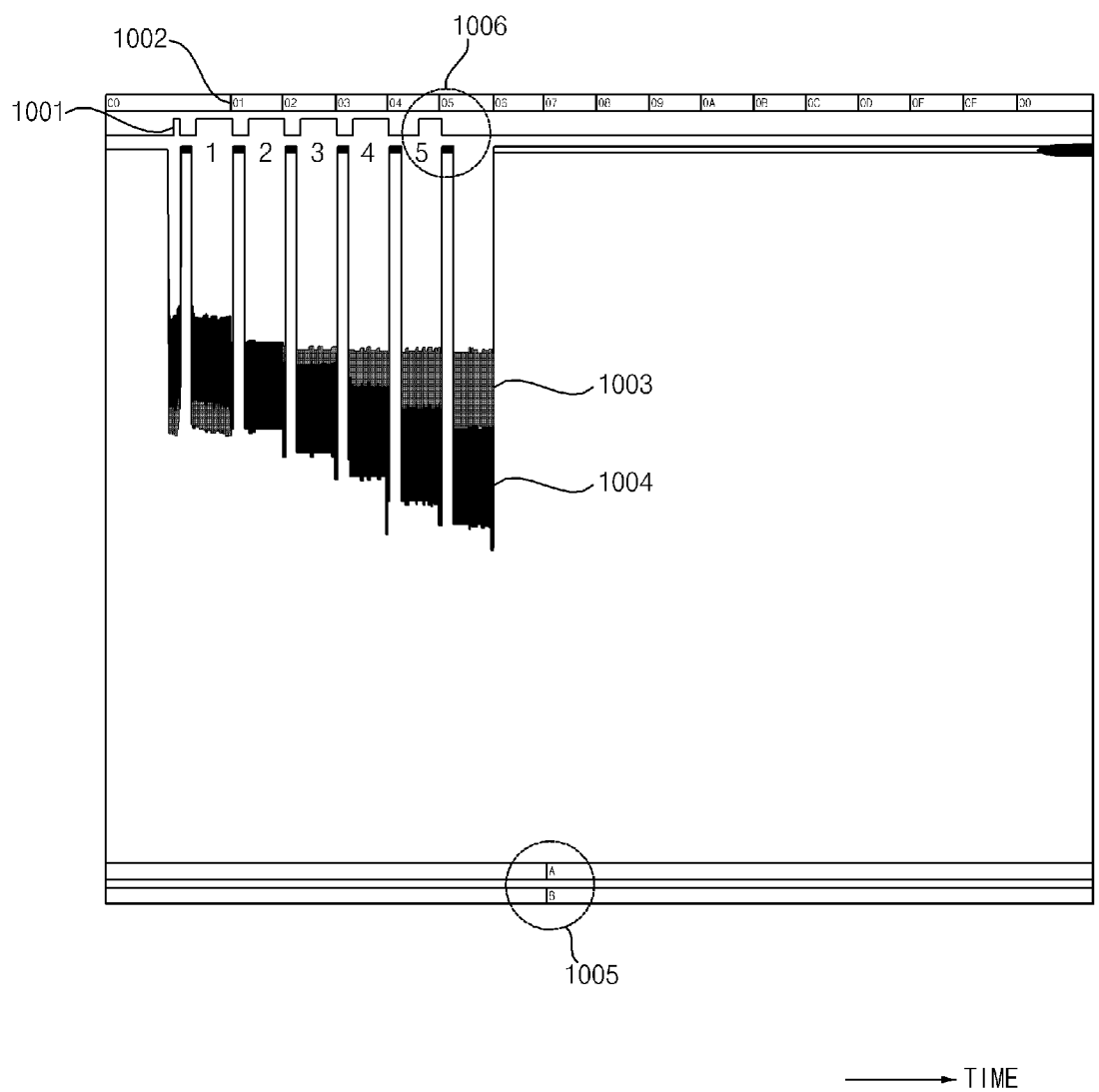

FIG. 10 is a diagram illustrating a clock training period according to another embodiment of the present disclosure. FIG. 10 illustrates output of an equalizer output value, a detection signal and a non-detection signal, an offset code, and a final counter value.

In the clock training period, when the equalizer adaptation is started, the digital controller 640 sets the first counter to '0' and outputs an offset code 1002, while sequentially increasing the offset code from a minimum value to a maximum value. Accordingly, an offset voltage applied to a first pattern signal sequentially increases, and a voltage value of a signal 1004 in which the offset voltage is applied to the first pattern signal sequentially decreases.

Each time the offset code 1002 is output, the detector 634 outputs a detection signal 1001. Each time the detection signal 1001 is output, the digital controller 640 increases the first counter value. FIG. 10 illustrates that the detection signal 1001 is output a total of 5 times and the first counter value increases to 5 equal to the number of times the detection signal 1001 is output.

When the offset voltage sequentially increases and the polarity of the difference value between the signal 1004 in which the offset voltage is applied to the first pattern signal and a second pattern signal 1003 does not change, the detection signal 1001 is not output and a non-detection signal 1006 is output.

The digital controller 640 may no longer output the offset code 1002 when the non-detection signal 1006 is output. The digital controller 640 determines the first counter value of '5' counted up to the period in which the immediately preceding offset code 1002 is output, as a final counter value, and outputs the same to the processor 631.

The processor 631 compares the final counter value of '5' with the counter values stored in the register 635 and outputs an equalizer control code 1005 corresponding to '5' to the equalizer 610. Thereby, the equalizer adaptation operation is terminated. Accordingly, the equalizer control code 1005 may be determined and the input signal may be equalized without the need to continuously output the offset code 1002 up to the maximum value. Accordingly, the equalizer may be adapted within a short time even when a channel environment changes.

Figure 11:
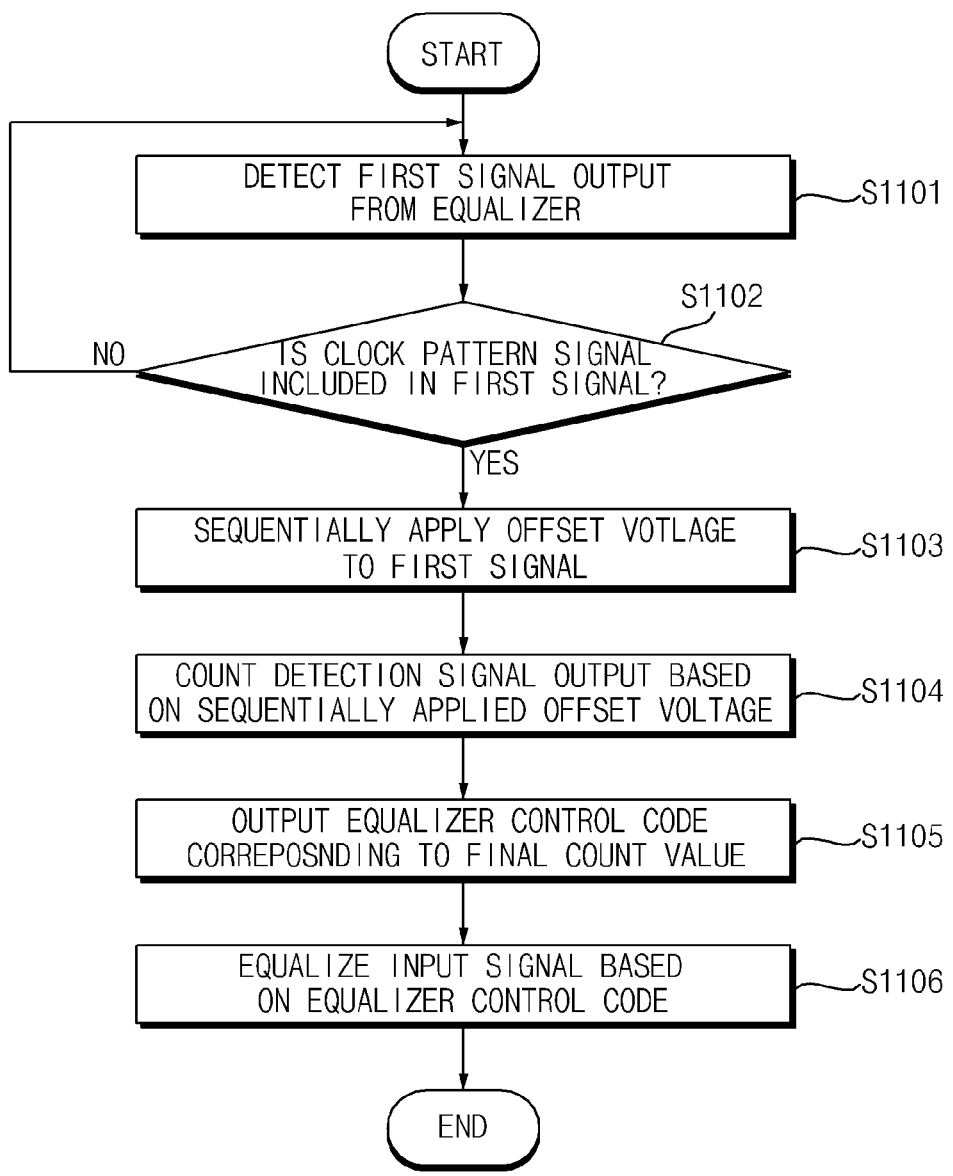

FIG. 11 is a flowchart illustrating a method of operating a signal processing device according to an embodiment of the present disclosure.

Referring to the drawing, the processor 631 in the signal processing device 600 detects a first signal output from the equalizer 610 (S1101).

The processor 631 determines whether a clock pattern signal is included in the first signal (S1102).

When the clock pattern signal is included, the offset applying circuit 632 sequentially applies the offset voltage to the first signal (S1103).

When the offset voltage is sequentially applied, the digital controller 640 sequentially counts the detection signals from the detector 634 (S1104).

After all the sequential offset voltages are applied, the digital controller 640 outputs the final count value, and the processor 631 outputs the equalizer control code corresponding to the final count value to the equalizer 610 (S1105).

The equalizer 610 equalizes the input signal based on the equalizer control code (S1106).

FIG. 12 is a diagram comparing an output signal (a) of an equalizer to which the signal processing device 600 of FIG. 7 is not applied and an output signal (b) of the equalizer of the signal processing device 600 of FIG. 7.

It can be seen that an eye pattern 1221 when the signal processing device 600 according to an embodiment of the present disclosure is applied has a height and a width higher and wider than those of an eye pattern 1211 of the case in which the signal processing device 600 is not applied.

Figure 13:
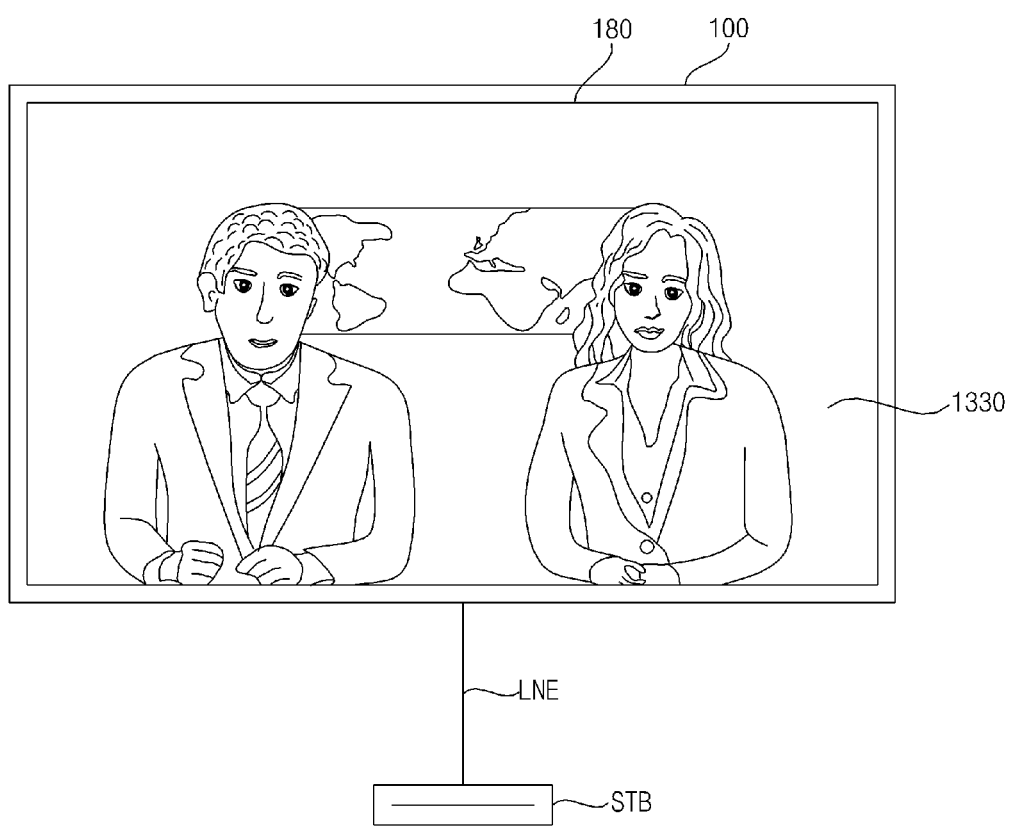

Accordingly, even when a channel environment changes, as shown in FIG. 13, the image display apparatus 100 may display a normal image 1330 on the display 180 and the user may enjoy a stable screen without blinking.

While the present disclosure has been particularly shown and described with reference to exemplary embodiments thereof, it is clearly understood that the present disclosure is not limited to the specific embodiment described above, and various modifications are available to those ordinary skilled in the art without departing from the subject matter claimed in the accompanying claims. Further, the various modifications should not be individually understood from the technical concept or prospect of the present disclosure.

What is claimed is:

1. A signal processing device comprising:
an equalizer configured to receive an input signal through a channel and equalize the received input signal; and
a control circuit configured to determine an equalizer control code in response to a first signal output from the equalizer and output the determined equalizer control code to the equalizer,
wherein the equalizer equalizes the received input signal based on the equalizer control code, and
wherein in response to the first signal comprising a clock pattern signal including a first pattern signal and a second pattern signal, the control circuit applies an offset voltage to the first pattern signal and measures the magnitude of the clock pattern signal based on a difference value between the second pattern signal and the first pattern signal to which the offset voltage is applied.

2. The signal processing device of claim 1, wherein the control circuit detects whether the clock pattern signal is included in the first signal output from the equalizer, and
wherein in response to the clock pattern signal being included in the first signal, the control circuit measures a magnitude of the clock pattern signal and outputs an equalizer control code corresponding to the measured magnitude of the clock pattern signal to the equalizer.

3. The signal processing device of claim 1, wherein the equalizer equalizes the received input signal by applying an equalizer gain to the received input signal.

4. The signal processing device of claim 3, wherein a code value of the equalizer control code increases as the magnitude of the clock pattern signal increases, and a gain value of the equalizer gain decreases as the code value of the equalizer control code increases.

5. The signal processing device of claim 1, wherein the control circuit comprises:
an offset applying circuit configured to apply the offset voltage;
an amplifier configured to amplify the difference value between the second pattern signal and the first pattern signal to which the offset voltage is applied; and
a detector outputting a detection signal or a non-detection signal based on an output value from the amplifier,
wherein the detector outputs the detection signal when a polarity of the output value from the amplifier is changed, and outputs the non-detection signal in response to the polarity of the output value from the amplifier being not changed.

6. The signal processing device of claim 5, wherein the offset applying circuit repeatedly increases a magnitude of the applied offset voltage as much as a predetermined magnitude by a specified number of times, and
wherein the detector outputs the detection signal or the non-detection signal each time the magnitude of the applied offset voltage is increased.

7. The signal processing device of claim 5, further comprising:
a digital controller configured to increase a first counter value each time the detection signal is output.

8. The signal processing device of claim 7, wherein, after the offset voltage is applied by the specified number of times, the digital controller determines the first counter value as a final counter value and outputs the final counter value to the control circuit.

9. The signal processing device of claim 8, further comprising:
a register configured to store a preset equalizer control code for each counter value; and
a processor configured to compare the final counter value received from the digital controller with the counter value stored in the register, determine an equalizer control code corresponding to the final counter value, and output the determined equalizer control code to the equalizer.

10. The signal processing device of claim 1, further comprising:
a clock and data recovery circuit (CDR) configured to recover a clock signal or a data signal from the first signal output from the equalizer and output the recovered signal.

11. The signal processing device of claim 10, further comprising:
a transmitter configured to transmit a feedback signal through a channel,
wherein in response to the clock signal or the data signal being not recovered from the first signal, the clock and data recovery circuit outputs the feedback signal to the transmitter.

12. The signal processing device of claim 1, wherein the equalizer comprises a continuous time linear equalizer.

13. An image display apparatus comprising:
a display; and
a signal processing device,
wherein the signal processing device comprises:
an equalizer configured to receive an input signal through a channel and equalize the received input signal; and
a control circuit configured to determine an equalizer control code in response to a first signal output from the equalizer and output the determined equalizer control code to the equalizer,
wherein the equalizer equalizes the received input signal based on the equalizer control code, and
wherein, in response to the first signal comprising a clock pattern signal including a first pattern signal and a second pattern signal, the control circuit applies an offset voltage to the first pattern signal and measures the magnitude of the clock pattern signal based on a difference value between the second pattern signal and the first pattern signal to which the offset voltage is applied.

14. The image display apparatus of claim 13, wherein the control circuit detects whether a clock pattern signal is included in the first signal output from the equalizer, and
wherein in response to the clock pattern signal being included in the first signal, the control circuit measures a magnitude of the clock pattern signal and outputs an equalizer control code corresponding to the measured magnitude of the clock pattern signal to the equalizer.

15. The image display apparatus of claim 13, wherein the equalizer equalizes the received input signal by applying an equalizer gain to the received input signal,
wherein a code value of the equalizer control code increases as the measured magnitude of the clock pattern signal increases, and a gain value of the equalizer gain decreases as the code value of the equalizer control code increases.

16. The image display apparatus of claim 13, wherein the control circuit comprises:
an offset applying circuit configured to apply the offset voltage;
an amplifier configured to amplify the difference value between the second pattern signal and the first pattern signal to which the offset voltage is applied; and
a detector outputting a detection signal or a non-detection signal based on an output value from the amplifier,
wherein the detector outputs the detection signal when a polarity of the output value from the amplifier is changed, and outputs the non-detection signal in response to the polarity of the output value from the amplifier being not changed.

17. The image display apparatus of claim 16, wherein the offset applying circuit repeatedly increases a magnitude of the applied offset voltage as much as a predetermined magnitude by a specified number of times, and
wherein the detector outputs the detection signal or the non-detection signal each time the magnitude of the applied offset voltage is increased.

18. The image display apparatus of claim 16, wherein the signal processing device further comprises:
a digital controller configured to increase a first counter value each time the detection signal is output.

* * * * *